Patented Jan. 6, 1948

2,434,229

UNITED STATES PATENT OFFICE 2,434,229

PRODUCTION OF ALPHA-HALOACRYLIC COMPOUNDS

David R. Saunders, Easton, Pa., assignor to General Aniline & Film Corporation, New York, N. Y., a corporation of Delaware No Drawing. Application July 26, 1945, Serial No. 607,259

10 Claims. (Cl. 260—486)

1

The present invention relates to a process of producing monomeric esters of $\alpha$-haloacrylic acids. More particularly, the invention relates to the preparation of esters of $\alpha$-chloracrylic acid.

It has already been proposed in U. S. Patent 2,245,547, granted to Pollack, to prepare monomeric esters of $\alpha$-haloacrylic acids by dehydrohalogenating the corresponding esters of dihalopropionic acids or substituted dihalopropionic acids, such as $\alpha,\beta$-dichloropropionic acid or of $\alpha,\alpha$-dichloropropionic acid.

The proposed method of dehydrohalogenation involves the treatment of the dihalopropionic acid esters with sodium, potassium, calcium, or magnesium hydroxides, or the corresponding bicarbonates or carbonates of these metals. However, the prior art method presents serious drawbacks. For example, there is a tendency for the esters to saponify and, accordingly, rigid precautions must be taken to prevent such saponification. Thus the prior art procedure requires that the alkali be carefully added to the dihalopropionic ester and at a rate corresponding to that substantially as rapidly as the resulting haloacrylic acid ester is formed. A further requirement is that the ester must be removed as rapidly as it is formed. Furthermore, the amount of water present must be carefully controlled since if sufficient water is present to form a solution of the alkali, considerably lower yields are obtained.

In application Serial No. 601,347, filed June 23, 1945, it is proposed to dehydrohalogenate $\alpha,\alpha$- or $\alpha,\beta$-dihalopropionic acid esters and their derivatives by contacting the esters with an aqueous solution of a salt of a carboxylic acid, such as an alkali metal or alkaline earth metal salt of a carboxylic acid. As examples of suitable salts, mentioned therein, are sodium and potassium acetate and the alkali metal and alkaline earth metal salts of tartaric, lactic, citric, benzoic, orthomethylol benzoic, salicylic, naphthalic, phthalic, malonic, maleic, chloracetic, oxalic, and fumaric acids, such as, for example, the ammonium, sodium, potassium, magnesium, calcium, strontium, or barium salts of these acids. By use of the salts of carboxylic acids, the danger of saponification is considerably reduced and the rigid conditions required by the patented process referred to are largely eliminated.

According to my invention, $\alpha,\alpha$- and $\alpha,\beta$-dihalopropionates and mixtures of these compounds may be more quickly and more completely dehydrohalogenated and the yield of the $\alpha$-haloacrylic acid ester obtained therefrom increased by incorporating a water-miscible organic solvent

2 in the aqueous alkali solution used for dehydrohalogenation. The alkaline agent may be any of those suggested in U. S. Patent 2,245,547 or the salt of a carboxylic acid as suggested in the aforementioned application.

More particularly, the $\alpha,\alpha$- and $\alpha,\beta$-dihalopropionates may be more quickly and more completely dehydrohalogenated when using aqueous solutions of mildly alkaline reagents, such as salts of carboxylic acids as, for example, those hereinabove mentioned, when the water-miscible organic solvent is incorporated in the aqueous medium in the ratio of solvent to water of from approximately 1:9 to approximately 9:1.

Any suitable water-miscible organic solvent may be used, such as the various water-miscible alcohols, glycols, glycerine, glycol ethers, glycerine ethers, glycol esters, glycerine esters, ethers, and ketones. As examples of such water-miscible solvents may be mentioned methyl, ethyl, propyl, and butyl alcohols, ethylene glycol, ethylene glycol monomethyl ether, ethyl glycol monoethyl, propyl and butyl ethers, ethylene glycol monoacetate, monoacetin, diacetin, glyceryl monoethyl ether, acetone, and the like.

The use of the water-miscible solvent has the advantage of serving to increase the concentration of the dihalopropionates in the alkaline phase of the reaction mixture and thereby of hastening their complete reaction. Furthermore, the use of the solvent serves to suppress the ionization of the alkaline reagent and consequently to minimize and considerably reduce hydrolytic cleavage or saponification of the esters.

In practice, it is preferred to run the dehydrohalogenation reaction in a concentrated mixture containing a high percentage of organic solvent, for example, at least 20% of solvent based on the total water plus organic solvent, the percentage being by weight. Then, when the reaction is substantially complete, the mixture is diluted by the addition of water. This reduces the solubility of the $\alpha$-haloacrylic acid ester formed in the alkaline phase and results in substantially complete separation of the crude $\alpha$-haloacrylate.

My invention is particularly advantageous when applied to the production of $\alpha$-haloacrylates where the esterifying group contains four or more carbon atoms as, for example, when dehydrohalogenating butyl, amyl, n-hexyl, octyl, lauryl, octadecyl and cyclohexyl esters of dihalopropionic acids as, for example, dichloropropionic acid. In these cases, the $\alpha$-haloacrylate and dihalopropionate mixture resulting from the dehydrohalogenation reaction is difficult to separate by distillation because the respective boiling points lie too close together. In order to obtain a pure α-haloacrylate on distillation, it is desirable to employ a mixture already containing substantially pure α-haloacrylate. Such a mixture is provided by the invention, since it results in a substantially complete conversion of the dihalopropionate into the α-haloacrylate.

In general, the dehydrohalogenation procedure may be carried out by mixing together water, the water-miscible organic solvent, the alkaline agent, the dihalopropionic acid esters and, if desired, a small amount of a polymerization inhibitor, such as hydroquinone, sulfur, and phenylene diamine. The ratio of the alkaline agent to the dihalopropionate may vary from a molecular ratio of 1:1 to as high as 2:1 or greater. A ratio greater than 1:1 is preferred when the salt of a carboxylic acid is used, whereas a ratio of 1:1 is preferred with stronger alkaline agents.

The dehydrohalogenation may be carried out at any suitable temperature. This may range from about 10° C. to about 150° C. or more, although the preferred mode is to reflux the mixture at atmospheric pressure. When using the higher temperatures, the dehydrohalogenation may be preferably carried out under pressure. It is desirable to agitate the mixture to facilitate the reaction.

When the reaction is substantially complete, the mixture may be diluted with water to cause substantially complete separation of the α-haloacrylate from the mixture. The product may then be washed with water, neutralized with a suitable dilute acid or alkali as, for example, sodium bicarbonate or acetic acid, depending on the pH of the crude product, then dried with a suitable dehydrating agent, such as anhydrous magnesium or sodium sulfate, silica, anhydrous alumina, potassium carbonate, or calcium sulfate. The product may be further purified by fractional distillation under reduced pressure.

The following examples are given as illustrative of my invention and not by way of limitation. The parts are by weight.

Example 1

| | Parts |
|---|---|
| Methyl α,β-dichloropropionate | 47.1 |
| Sodium acetate | 30.6 |
| Water | 50.0 |
| Isopropyl alcohol | 20.0 | are stirred and refluxed for 1½ hours. The reaction mixture is cooled and the lower organic layer separated, washed with water, treated with about 3% sodium bicarbonate solution to neutralize any acetic acid remaining from that formed by the dehydrohalogenation, again washed with water and then dried over sodium sulfate. The material thus obtained is then distilled in vacuum to recover purified methyl α-chloracrylate.

Example 2

| | Parts |
|---|---|
| Cyclohexyl α,β-dichloropropionate | 59.3 |
| Sodium acetate | 61.5 |
| Water | 50.0 |
| Ethylene glycol monomethylether | 24.1 |
| Hydroquinone | 2.0 | are stirred and refluxed for 2 hours. The reaction mixture is diluted with 50.0 parts of additional water and cooled below 30° C. The organic layer is separated and diluted with 90.0 parts of chloroform, washed with water, neutralized with about 3% aqueous sodium bicarbonate solution, washed with water, and dried over magnesium sulfate. The chloroform is distilled from the solution thus obtained and the residue distilled in vacuum. Highly purified cyclohexyl α-chloroacrylate is collected at 65–68° C. at 2 millimeters of mercury pressure.

Example 3

| | Parts |
|---|---|
| Isopropyl α,β-dichloropropionate | 92.5 |
| Sodium carbonate | 53.0 |
| Water | 100.0 |
| Glycerine | 25.0 |
| Hydroquinone | 2.0 | are stirred and refluxed for 2 hours. The reaction mixture is cooled and the organic layer separated, washed with water, treated with about 3% aqueous acetic acid to neutralize the remaining excess sodium carbonate, again washed with water and dried over sodium sulfate. The material thus obtained is distilled in vacuum to effect recovery of substantially pure isopropyl α-chloroacrylate, which may be collected at 53 to 55° C. at 20 millimeters of mercury.

Example 4

| | Parts |
|---|---|
| Allyl α,β-dichloropropionate | 50.0 |
| Sodium acetate | 61.5 |
| Water | 100.0 |
| Ethylene glycol | 25.0 |
| Hydroquinone | 2.0 | are stirred and refluxed for 1½ hours, then cooled to below 30° C. The lower organic layer is separated and washed with water, neutralized with about 3% aqueous sodium bicarbonate solution, washed again with water and dried over magnesium sulfate. The material so obtained is distilled under reduced pressure, thereby effecting recovery of quite pure allyl α-chloracrylate, which may be collected at 67 to 70° C. under a pressure of 20 millimeters of mercury.

By the term "water-miscible organic solvent," I intend to include all organic solvents which are soluble in the dehydrohalogenating reaction mixture under the reaction conditions utilized. Such solvents are also included under this term which may not be completely miscible but are sufficiently soluble in the reaction mixture for the purpose of my invention.

It is to be understood that esters of α,β- and the corresponding esters of α,α-dihalopropionic acids and their corresponding derivatives and mixtures thereof other than those mentioned in the examples may similarly be converted into the corresponding α-haloacrylic compounds. As examples of other esters, which may be dehydrohalogenated by my process, may be mentioned the alkyl esters, such as ethyl, propyl, butyl, amyl, isoamyl, n-hexyl, octyl, lauryl, and octadecyl esters of α,α- and α,β-dichloropropionic acid; and the chloroalkyl esters thereof as, for example, β-chlorethyl, α,α- and α,β-dichloropropionate. In addition, there may be mentioned the corresponding alkenyl esters, such as methallyl, crotyl, oleyl, or chlorallyl esters which may be treated to form similar unsaturated esters of α-chloracrylic acid. The process is also effective in the dehydrohalogenation of polyhydric esters, such as glycol, glycerol, sorbitol, and mannitol esters, and also the aryl, heterocyclic, cycloparaffinic esters, such as, for example, phenyl, cresyl, resorcinyl, naphthyl, benzyl, fenchyl, cyclohexyl, and furfuryl esters which may be treated in the same manner to give the corresponding α-haloacrylic acid esters.

Since it is apparent that the invention may be varied without departing from the spirit and scope thereof, it is to be understood that it is not limited to the specific embodiments above set forth but only in accordance with the scope of the appended claims.

I claim:

1. A method of preparing cyclohexyl α-chloracrylate which comprises dehydrochlorinating the corresponding ester of α,β-dichloropropionic acid in a concentrated mixture of an aqueous solution of sodium acetate containing at least 20% of ethylene glycol monomethyl ether based on the total weight of water and ethylene glycol monomethyl ether, and when the reaction is substantially complete diluting the reaction mixture with water to separate the cyclohexyl α-chloracrylate formed.

2. A process of preparing an ester of an α-haloacrylic acid which comprises dehydrohalogenating an ester of a dihalopropionic acid having in the α-position at least one halogen atom, in the presence of an alkaline agent, an amount of water sufficient to form an aqueous solution of said alkaline agent, and a water-miscible organic solvent in an amount of at least 10% based on the total weight of water and solvent.

3. A process of preparing an ester of an α-haloacrylic acid which comprises dehydrohalogenating an ester of a dihalopropionic acid having in the α-position at least one halogen atom, in the presence of an alkaline agent, an amount of water sufficient to form an aqueous solution of said alkaline agent, and a water-miscible organic solvent, the ratio by weight of organic solvent to water ranging from about 1:9 to about 9:1.

4. A method of preparing an ester of α-chloracrylic acid which comprises dehydrochlorinating an ester of α,β-dichloropropionic acid, in the presence of an alkaline agent, an amount of water sufficient to form an aqueous solution of said alkaline agent, and a water-miscible organic solvent in an amount of at least 10% based on the total weight of water and solvent.

5. A method of preparing an ester of α-chloracrylic acid which comprises dehydrochlorinating an ester of α,β-dichloropropionic acid, in the presence of an alkaline agent, an amount of water sufficient to form an aqueous solution of said alkaline agent, and a water-miscible organic solvent, the ratio by weight of organic solvent to water ranging from about 1:9 to about 9:1.

6. A method of preparing methyl α-chloracrylate which comprises dehydrochlorinating methyl α,β-dichloropropionate in the presence of an alkaline agent, an amount of water sufficient to form an aqueous solution of said alkaline agent, and a water-miscible organic solvent in an amount of at least 10% based on the total weight of water and solvent.

7. A method of preparing methyl α-chloracrylate which comprises dehydrochlorinating methyl α,β-dichloropropionate in the presence of sodium acetate, an amount of water sufficient to form an aqueous solution of said sodium acetate, and ethylene glycol monomethyl ether in an amount of at least 10% based on the total weight of water and ethylene glycol monomethyl ether.

8. A method of preparing an ester of α-haloacrylic acid which comprises dehydrohalogenating the corresponding ester of a dihalopropionic acid having in the α-position at least one halogen atom, in a concentrated mixture comprising an alkaline agent, an amount of water sufficient to form an aqueous solution of said alkaline agent, and a water-miscible organic solvent in an amount materially exceeding 10% based on the total weight of water and solvent, and when the reaction is substantially complete, diluting the reacted mixture with an additional amount of water to separate the α-haloacrylic ester formed.

9. A method of preparing an ester of α-haloacrylic acid containing at least four carbon atoms in the ester group which comprises dehydrohalogenating the corresponding ester of a dihalopropionic acid having in the α-position at least one halogen atom, in a concentrated mixture comprising an alkaline agent, an amount of water sufficient to form an aqueous solution of said alkaline agent, and a water-miscible organic solvent in an amount materially exceeding 10% based on the total weight of water and solvent, and when the reaction is substantially complete, diluting the reacted mixture with an additional amount of water to separate the α-haloacrylic ester formed.

10. A method of preparing methyl α-chloracrylate which comprises dehydrochlorinating methyl α,β-dichloropropionate in a mixture comprising sodium acetate, an amount of water sufficient to form an aqueous solution of said sodium acetate, and isopropyl alcohol in an amount materially exceeding 10% based on the total weight of water and isopropyl alcohol.

DAVID R. SAUNDERS.

REFERENCES CITED

The following references are of record in the file of this patent:

UNITED STATES PATENTS

| Number | Name | Date |
|---|---|---|
| 2,245,547 | Pollack | June 10, 1941 |
| 2,322,258 | Strosacker et al. | June 22, 1943 |
| 1,980,711 | Bannister et al. | Nov. 13, 1934 |
| 1,864,884 | Bauer | June 28, 1932 |

FOREIGN PATENTS

| Number | Country | Date |
|---|---|---|
| 546,141 | Germany | Mar. 12, 1932 |